United States Patent
Zeller

(10) Patent No.: US 7,211,988 B2
(45) Date of Patent: May 1, 2007

(54) METHOD FOR CONSTANT-CURRENT GENERATION AND DEVICE USED TO CARRY OUT SAID METHOD

(75) Inventor: Peter Kilian Zeller, Reutlingen-Ohmenhausen (DE)

(73) Assignee: Permagen Motoren- und Generatorentechnik GmbH, Radeberg (DE)

( * ) Notice: Subject to any disclaimer, the term of this patent is extended or adjusted under 35 U.S.C. 154(b) by 0 days.

(21) Appl. No.: 10/343,088

(22) PCT Filed: Jul. 26, 2001

(86) PCT No.: PCT/DE01/02835

§ 371 (c)(1), (2), (4) Date: Jul. 26, 2004

(87) PCT Pub. No.: WO02/09267

PCT Pub. Date: Jan. 31, 2002

(65) Prior Publication Data

US 2004/0257050 A1 Dec. 23, 2004

(30) Foreign Application Priority Data

Jul. 26, 2000 (DE) .................. 100 36 419

(51) Int. Cl.
H02P 9/48 (2006.01)

(52) U.S. Cl. .............................. 322/27; 322/28; 363/81

(58) Field of Classification Search .................... 322/4, 322/27, 28, 37, 46; 363/81, 126, 127
See application file for complete search history.

(56) References Cited

U.S. PATENT DOCUMENTS

| | | | | |
|---|---|---|---|---|
| 3,971,977 A | * | 7/1976 | Hirt et al. | 322/1 |
| 4,816,985 A | * | 3/1989 | Tanahashi | 363/81 |
| 5,028,804 A | * | 7/1991 | Lauw | 290/40 C |
| 5,255,175 A | * | 10/1993 | Uchino | 363/81 |
| 5,608,616 A | * | 3/1997 | Umeda et al. | 363/132 |
| 5,625,276 A | * | 4/1997 | Scott et al. | 322/24 |
| 5,892,674 A | * | 4/1999 | Shimada et al. | 363/127 |
| 6,049,194 A | * | 4/2000 | Nakagawa et al. | 322/20 |
| 6,737,775 B2 | * | 5/2004 | Hatz et al. | 310/74 |
| 6,806,687 B2 | * | 10/2004 | Kajiura | 322/16 |
| 7,075,273 B2 | * | 7/2006 | O'Gorman et al. | 322/28 |

* cited by examiner

*Primary Examiner*—Nicholas Ponomarenko
(74) *Attorney, Agent, or Firm*—Bachman & LaPointe, P.C.

(57) ABSTRACT

A method for constant-current generation by means of a rotational energy source, a generator and a control circuit connected to the generator. Mechanical rotational energy is generated by the energy source and the mechanical rotational energy is transmitted to the generator rotor. The magnetic field distribution produced in the generator is controlled by the control circuit that controls the current distribution in the generator between load current and generator current by feedback control by generating an opposing magnetic field. The power uptake and the current output are adapted without losses and the alternating current generated by the generator is transferred to an averaging direct-current circuit. A suitable device for carrying out the method is also provided.

10 Claims, 5 Drawing Sheets

METHOD FOR CONSTANT-CURRENT GENERATION AND DEVICE USED TO CARRY OUT SAID METHOD

BACKGROUND OF THE INVENTION

The invention relates to a method for constant-current generation and device used to carry out said method.

Electrical power generators, in particular those that produce electrical power from internal combustion engines, are known, for example generators whose output frequency has a fixed relationship with the rotational speed of the drive. Known in particular are electrical power generators which operate at a constant rotational speed. In the case of smaller generators having permanent-magnet excitation and a d.c. intermediate circuit, attempts to achieve a constant voltage independently of rotational speed have usually involved the use of parallel regulators, in the case of which any excess power generated was converted into thermal losses/energy, i.e. was wasted.

In this regard a combined motor/generator system for generating electrical power for single-phase emergency power supply systems has been disclosed, for example, by HONDA, in which an external rotor of a generator was integrated in an internal combustion engine, with the result that savings could be made in terms of costly generator shafts and generator components. This known system was disadvantageous, however, in that it always required a specially designed and adapted internal combustion engine as the energy source. This construction also does not satisfy stringent protection class requirements—i.e. it is not suitable for use in certain environmental conditions, such as outdoor use subject to weathering conditions or else in areas of high humidity or in areas in which a high protection class is required by law, for example by fire services, technical assistance organizations, field hospitals, etc.

One object of the invention is therefore to specify a method for generating electrical power which enables a current level which is independent of rotational speed for a wide range of input rotational speeds.

SUMMARY OF THE INVENTION

The object is achieved according to the invention by a method for generating constant current by means of a rotational energy source, a generator and a control circuit connected to the generator, comprising production of mechanical rotational energy by the energy source, transfer of the mechanical rotational energy to the generator rotor, control of the magnetic field distribution generated in the generator by means of the control circuit which is capable of regulating, by feedback control, the current distribution in the generator between the load current and the generator current by an opposing magnetic field being induced in the generator such that the power consumption is matched to the current output with low losses and the alternating current generated by the generator being drawn off and fed to an averaging d.c. circuit.

Due to the fact that feedback control is now provided in the generator itself by varying the distribution of the generated current between load current and feedback current, it is possible to optimize the generation of electrical power from the rotational energy since, due to the build-up of opposing magnetic fields in the generator, it is possible to create very little excess energy that needs to be destroyed thermally.

The method according to the invention makes it possible for a wide variety of rotational energy sources to be used to produce constant current, for example internal combustion engines such as Sterling engines, diesel engines, Wankel engines and Otto-cycle engines, as well as turbines, driven wheels, wind-powered wheels, hydraulic motors, pneumatic motors, etc.

It is advantageous if the rotational energy source, for example an internal combustion engine, is controlled by means of the control circuit. This may be achieved, for example, by adjusting the throttle valve in a controlled manner, by varying the fuel supply, by adjusting a valve in the case of wheels or turbines driven by water power, by varying the air/gas supply in the case of gas/pneumatic motors or turbines, by adjusting the turbine blades or the hydraulic pressure or by distributing the volume flow etc. in order to ensure optimum energy supply to the generator. In this case this optimization may be carried out in terms of fuel consumption, noise, service life, emissions of pollutants, heat generation, load demands, for example in the case of dynamic load demands or fluctuations in load, the drive selected (for example changeover from water/wind power to internal combustion engine or between different motors) avoiding critical rotational speed ranges or load ranges. In this manner it is possible, particularly in the case of diesel engines, to operate at defined base loads in order to avoid incomplete combustion and resultant deposits in the combustion chamber as well as emissions, or else to provide specifically "clean-burn cycles" for carbon filters in order to avoid the need for maintenance work.

It is particularly advantageous if the permanent-magnet arrangement of the generator rotor being driven and the stator assembly are geometrically matched to one another so that, in combination, these geometries have both local magnetic saturation effects and specific field-distortion effects when the generator is in operation, with the result that a constant current is generated that is independent of the rotational speed. Here, a feedback controller, connected to the generator, controls the magnetic field induced in the generator in accordance with the generator parameters such that an essentially constant current level is output by said generator, independently of the energy introduced into the generator and drawn off. It is possible to calculate the appropriate configuration for the geometries in the manner known to those skilled in the art, as is described, for example, by E. Spring in "Elektrische Maschinen" [Electrical machines], Springer Verlag Berlin/Heidelberg 1999 as well as the finite element method.

It is thus possible in a simple manner to use even energy sources whose behavior cannot be controlled, such as wind-driven or hydroelectric power stations, as rotational energy sources and to use them to obtain a constant current without too much difficulty.

It is advantageous if the generator has an external rotor having permanent magnets, since then the physical size may be kept small and, with the same mass, the mass moment of inertia is considerably greater than in the case of the conventional internal rotor configuration, as a result of which flywheels on motors generating rotational energy can be reduced in size or dispensed with entirely. By this means it is also possible for the fixing of permanent magnets on the rotor to be simplified or for the load on said permanent magnets brought about by the centrifugal force to be used to advantage for reinforcing the connection. It is particularly advantageous in this case if the external rotor is designed to be integral with an outer housing which protects the generator, has additional flywheel properties and provides encapsulation against the ingress of moisture and dust, or other impurities. This outer housing may advantageously also be fit with fins or the like which provide cooling, if necessary, for the generator during operation without—as is often the case in the prior art—the need for the provision of additional cooling devices. This design also contributes to a compact structure, high reliability of the electrical power generator and cost-effective manufacture.

In one particularly preferred embodiment, the rotor is connected directly to the output drive shaft of the energy source—preferably a motor. This is made possible by the electrical power being generated independently of the rotational speed and has the advantage, inter alia, that savings can be made in terms of bearings, couplings, etc., as were necessary in the case of known electrical power generators, and that an easier and simplified construction is achieved. The number of parts subject to wear can also be reduced by this means.

Preferred exemplary embodiments of the invention are explained in more detail below with the aid of the attached drawing, in which:

DETAILED DESCRIPTION

Figure 1:
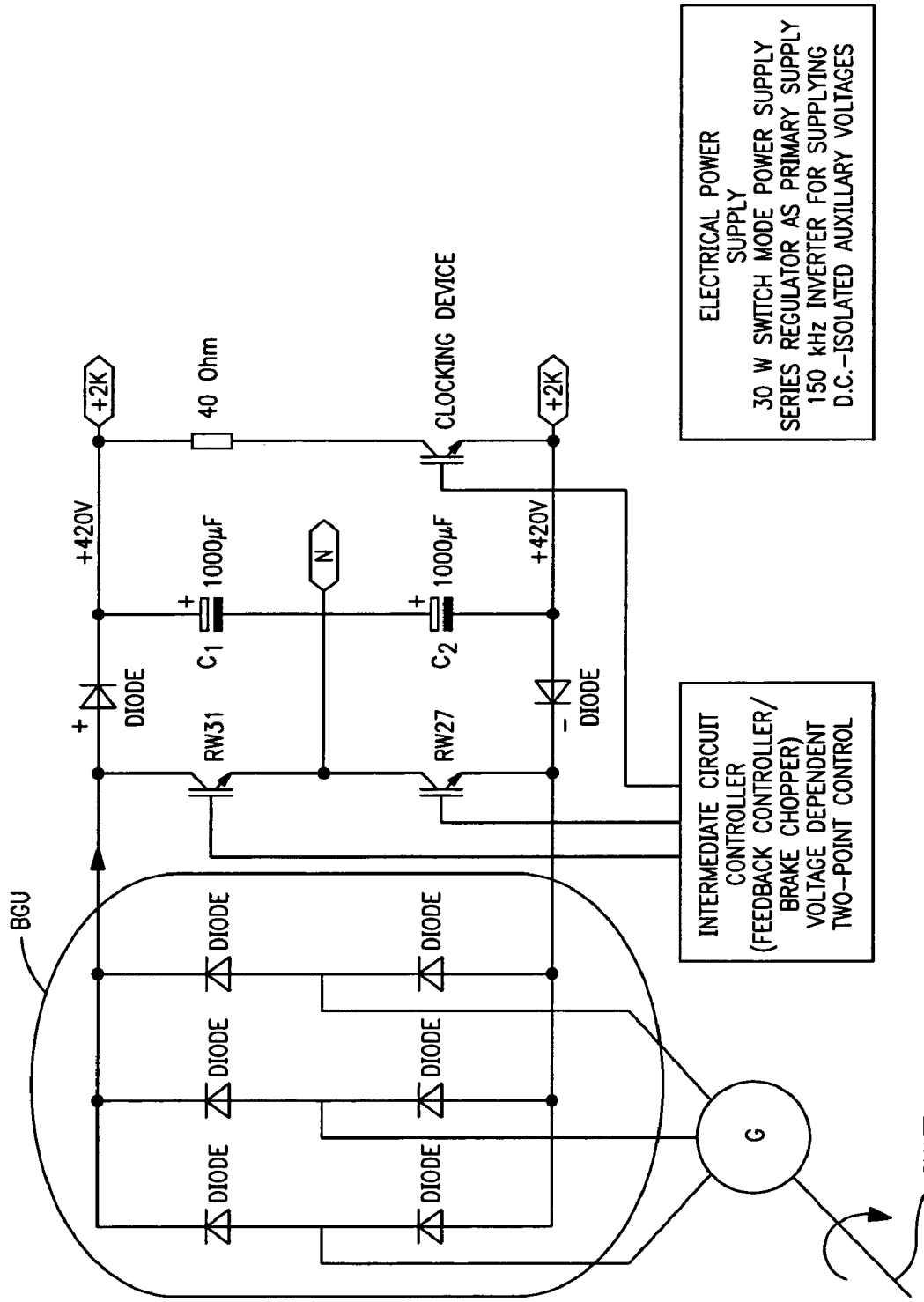
FIG. 1 shows a flowchart for the method according to the invention

As shown in FIG. 1, the method according to the invention provides a feedback controller which is capable of varying the ratio between a load current and the generator current by means of a regulator. The current generated by the generator in the stator 12 is then measured and is checked by internal logic in a feedback controller to ascertain whether it is within the desired range. If the generated current is not in the desired range, the load current/generator current ratio is varied by the feedback controller so that the generator current is in the desired value range again. The generator current/load current ratio is constantly ascertained and adjusted in this manner in order to ensure that the generator current remains constant. A current is preferably used as the load current which induces an opposing magnetic field in the generator, with the result that it is then possible for the amount of current generated to be reduced.

Figure 1A:
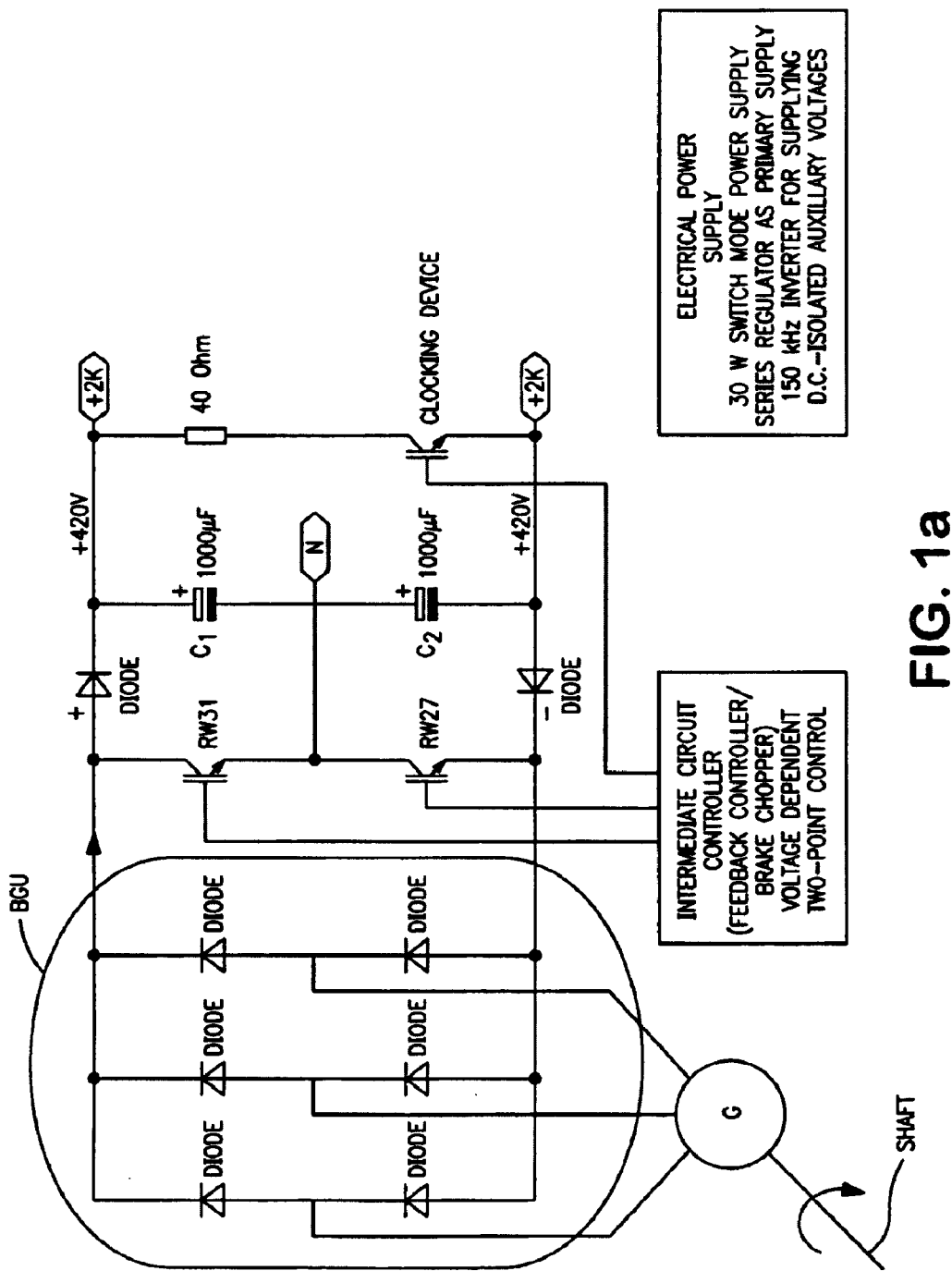
FIG. 1a shows a circuit diagram for a feedback controller which implements the method according to the invention

FIG. 1a shows one preferred embodiment of a control circuit for carrying out the method in FIG. 1. The generator G is in this case used as a current source, as opposed to the prior art in which generators are usually used as a voltage source, and can be controlled by feedback. The current output by said generator G is rectified by means of the uncontrolled 6-pulse rectifier in the circuit, designated BGU, and is fed to the intermediate circuit control system.

The generator is then short-circuited if it generates too much current, so that no energy is output and the voltage can be maintained at the desired value. The controlled switching elements RWS1 and RWS2 (for example IGBPS=isolated gated bipolar transistors) can be actuated and closed separately from one another, with the result, that voltage is built up symmetrically between the center of the switches and the terminals. In the process, the switching element opposite, in FIG. 1a, charges the diagonally opposite capacitor, i.e. RWS1 for C2 and RWS2 for C1. If both the IGBPs are open, both the capacitors C1 and C2 are charged. If both are closed, the generator is short-circuited and no charging of the capacitors takes place. If only one IGBP is open, the obliquely opposite capacitor is charged. Therefore, at low generator rotational speeds, "current pumping" via the capacitors will still lead to a desired end voltage. In this manner the drive motor is not subjected to heavy or excess loads by the generator, since the method according to the invention distributes the current such that the rated voltage is represented even at low generator rotational speeds, i.e. the generator becomes more tolerant in terms of rotational speed. For comparison purposes; A "normal" generator having a rating of approximately 10 kW and the same outer geometry has a rotational speed tolerance of approximately 30% at—for a constant voltage design—about 1:1.3. In contrast to this, a tolerance of about 1:3.5 is achieved according to the invention. The generator according to the invention is, therefore, a constant current generator which permits torque to be applied to the drive shaft and can tolerate, without difficulty, dynamic changes in rotational speed over a relatively wide range of rotational speeds without overvoltages occurring. In many cases it is possible in this way for even relatively small motors to be used for the desired voltage generation.

Figure 2:
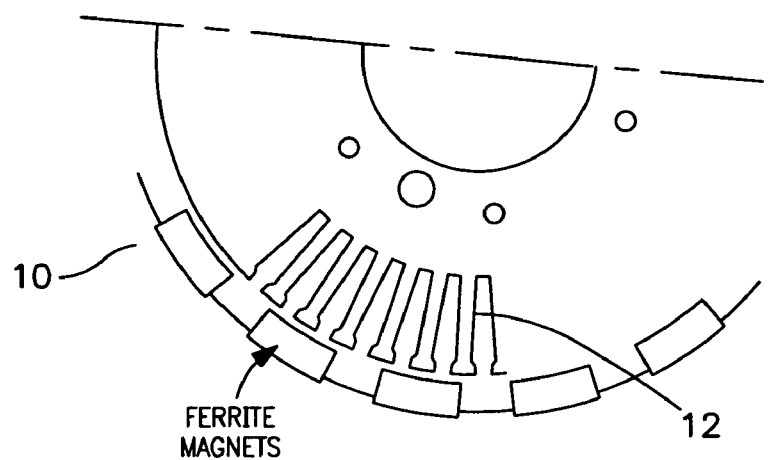
FIG. 2 shows a part of a section through an optimized rotor/stator arrangement of an electrical power generator according to the invention having ferrite magnets in the rotor
Figure 2A:
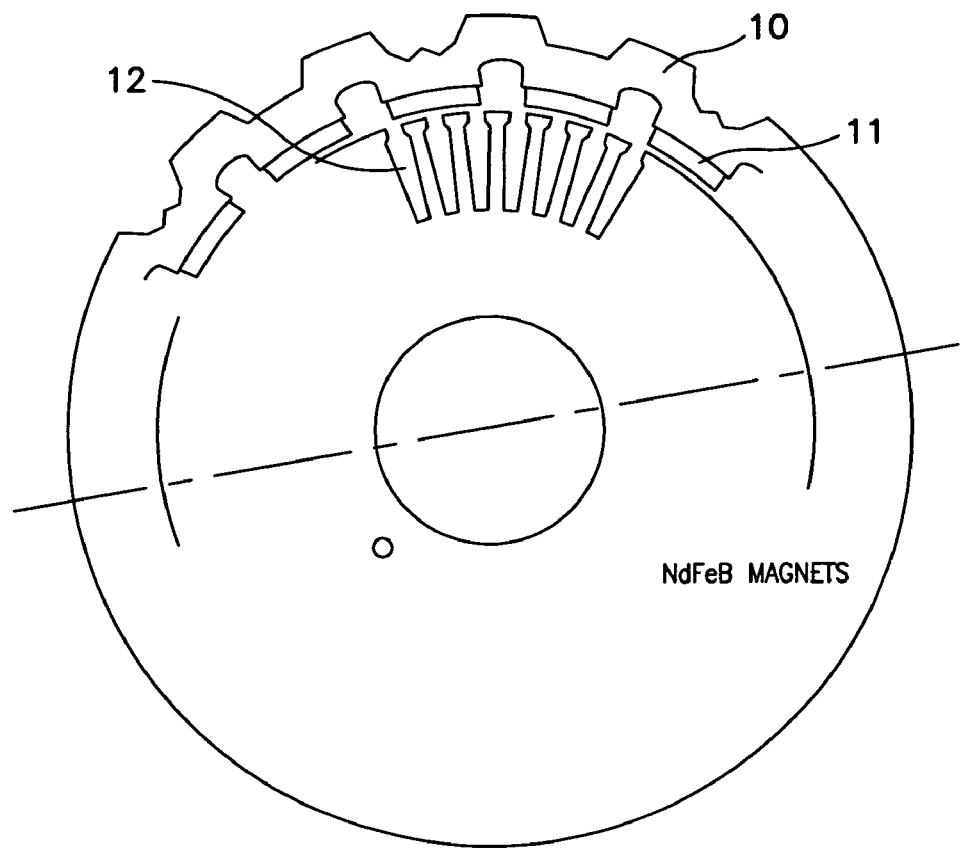
FIG. 2a shows a partial view of a section of an optimized rotor/stator arrangement of an electrical power generator according to the invention having NdFeB magnets in the rotor
Figure 2B:
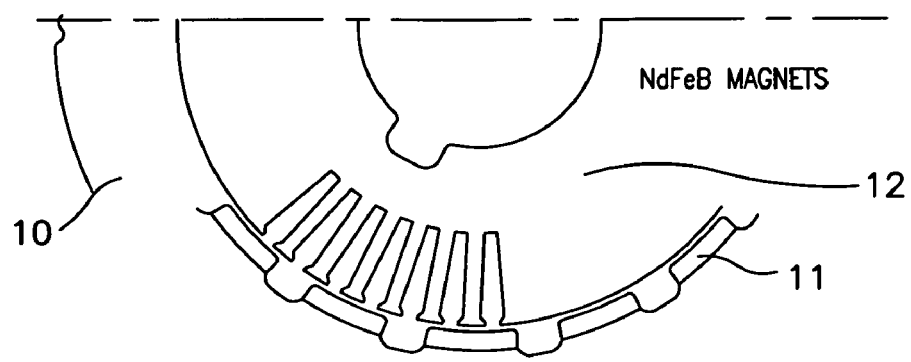
FIG. 2b shows a partial view of a section of an optimized rotor/stator arrangement of an electrical power generator according to the invention having NdFeB magnets

FIG. 2 shows preferred geometries for the rotor/stator arrangement of an electrical power generator according to the invention in which, for simplification purposes, the wire windings around the cores of the stator 12 have been omitted. In this case, as can be seen from the drawing in FIG. 2a, for example, more than two coil cores of defined geometry are positioned opposite a magnet 11 in the rotor 10 in the case of ferrite permanent magnets for correspondingly forming an induced magnetic field which results in a constant current during rotation. FIG. 2b shows an arrangement having an NdFeB magnet—a slightly different magnet geometry has been used here, as well as a slightly different stator geometry 12.

The particular geometry must be optimized according to the requirements of the individual case on the basis of the different permanent-magnet materials or the different behavior of the magnetic fields, as is known to those skilled in the art.

The geometrical configuration brings about a self-regulating effect in the generator itself—i.e. an ever increasing braking effect will be observed at higher rotational speeds due to the dynamic build-up: of the field in the magnetic material, which does not take place at lower speeds. As the rotational speed increases, the magnetically effective pole area is reduced by the field-distortion effect, producing a partial local field short-circuit in the extended air-gap region (air-gap exit zone). The rotor geometry has specific zones for local magnetic field saturation.

Figure 3:
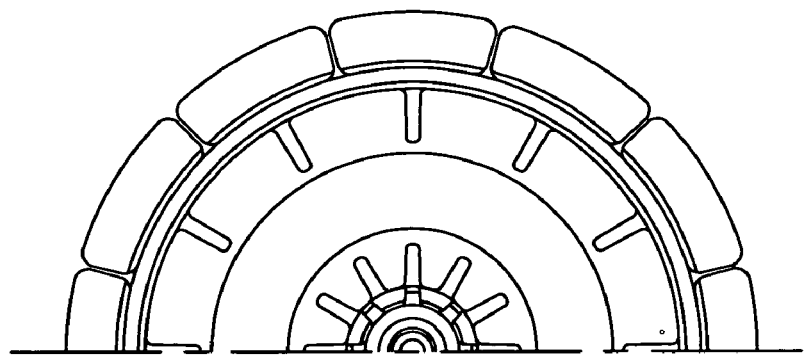
FIG. 3 shows an illustration of one rotor geometry and FIG. 4 shows an illustration of a further preferred rotor geometry.
Figure 3:
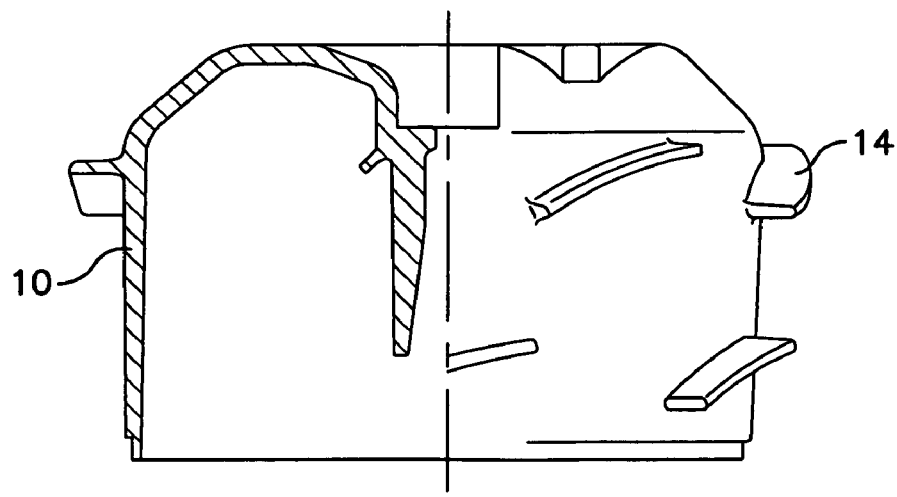

FIG. 3 represents an embodiment of the rotor which also serves as a protective and enclosing housing in this case. As can be seen from the drawing, in this and similar embodiments the internal, sensitive stator 12 and its windings are protected by the pot-like configuration of the rotor 10, while gas guide vanes 14 and other air-guiding devices, such as grooves etc. can be provided on those rotor surfaces which do not have permanent magnets 11 fit to them, as a result of which heat can be dissipated from the generator, or air can be passed through it, without any difficulty. However, the pot-like configuration is not essential. It is only important that the rotor configuration reliably maintains the necessary geometric arrangement of the permanent magnets fit to it. If better cooling is required, it is possible for apertures or else other guide sections to be provided in the rotor 10.

Figure 4:
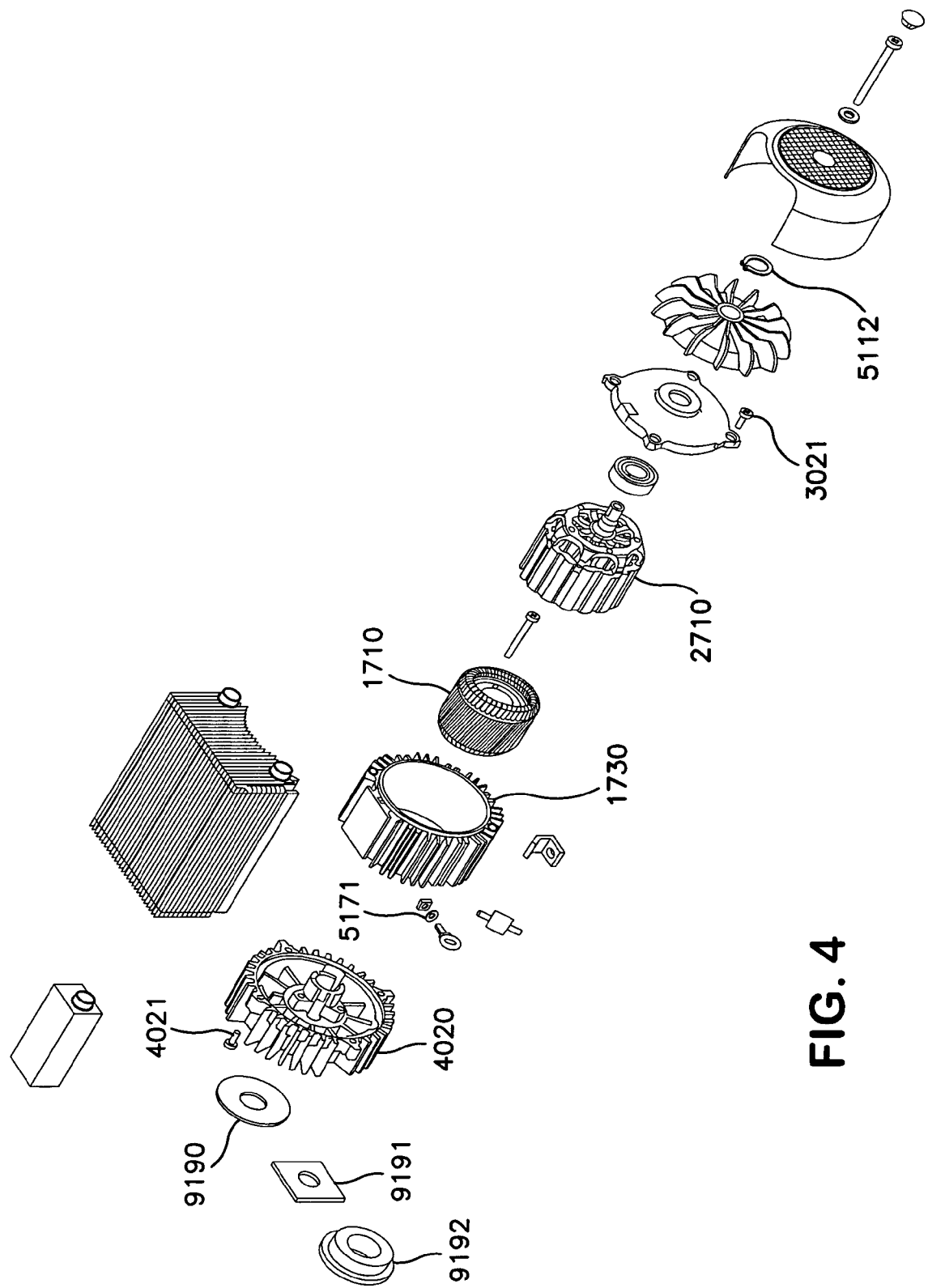

FIG. 4 shows an exploded illustration of an alternative embodiment for the rotor design. In this case, the rotor 1730 is formed separately from an outer housing using 4020, as a result of which the rotor is provided with better protection. The important feature here is the driving element 2710, which makes it possible for the rotor to be suspended at one end and acts at the same time as a radial displacement fan.

The rotor may be produced from any suitable material—it may be made of metal, but also at least partially—with the exception of the permanent magnets—of other materials, for example plastic, if appropriate reinforced plastic which has the advantage of being less susceptible to corrosion and low in weight, or else a suitable ceramic.

Of course, the invention is not limited to the embodiments illustrated, rat here are many possible refinements of the teaching of the invention within the protective scope of the claims, which are obvious to those skilled in the art.

The invention claimed is:

1. A device for producing electrical power, comprising:
   a rotational energy source to be rotated at a rotational speed,
   a generator having a generator rotor to be driven by the rotational energy source, the generator rotor further comprising a specific geometry, and having a stator assembly with a geometry which is matched to the geometry of the generator rotor, the stator having windings through which an electrical generator currents are flowing, said geometries being selected such that they provide both local magnetic saturation effects and specific field-distortion effects in order to produce a constant generator current by a feedback control system, which is independent of the rotational speed,
   a rectifier rectifying the generator so as to provide an intermediate DC voltage,
   said feedback control system connected to the generator and receiving the intermediate DC voltage, which control system controls the magnetic field induced in the generator in accordance with generator parameters such that an essentially constant current level is output by said generator, independently of the energy introduced into the generator and independently of the energy drawn off from the power producing device,
   wherein the control system comprises two switching elements connected in series across the intermediate DC voltage and two capacitors connected in series across an output voltage, wherein a node between the two switching elements and a node between the two capacitors are connected with each other, and wherein the two switching elements can be actuated and closed separately from each other.

2. The device as claimed in claim 1, wherein the rotor is an external rotor.

3. The device as claimed in claim 2, wherein the external rotor is designed to be integral with an outer housing which has air guide vanes on its outer circumference.

4. The device as claimed in claim 1, wherein a rotating part of the energy source, such as an output drive shaft or a flywheel thereof, is directly connected to the rotor (10).

5. The device as claimed in claim 1, wherein, in one operation mode, the switching elements are feed-back controlled in accordance with output voltage.

6. The device as claimed in claim 1, wherein the control system is adapted to control the rotational speed of the rotational energy source.

7. The device as claimed in claim 1, wherein the generator rotor comprises permanent magnets.

8. The device as claimed in claim 1, wherein the rotor is arranged external of the stator.

9. The device as claimed in claim 1, wherein the stator comprises a plurality of coil cores around which windings are wound.

10. The device as claimed in claim 9, wherein the rotor comprises a plurality of permanent magnet, and wherein opposite each permanent magnet more than two coil cores of defined geometry are located.

* * * * *